June 20, 1950 — C. A. BROWN — 2,512,052
DRAIN VALVE
Filed May 10, 1945 — 2 Sheets-Sheet 1
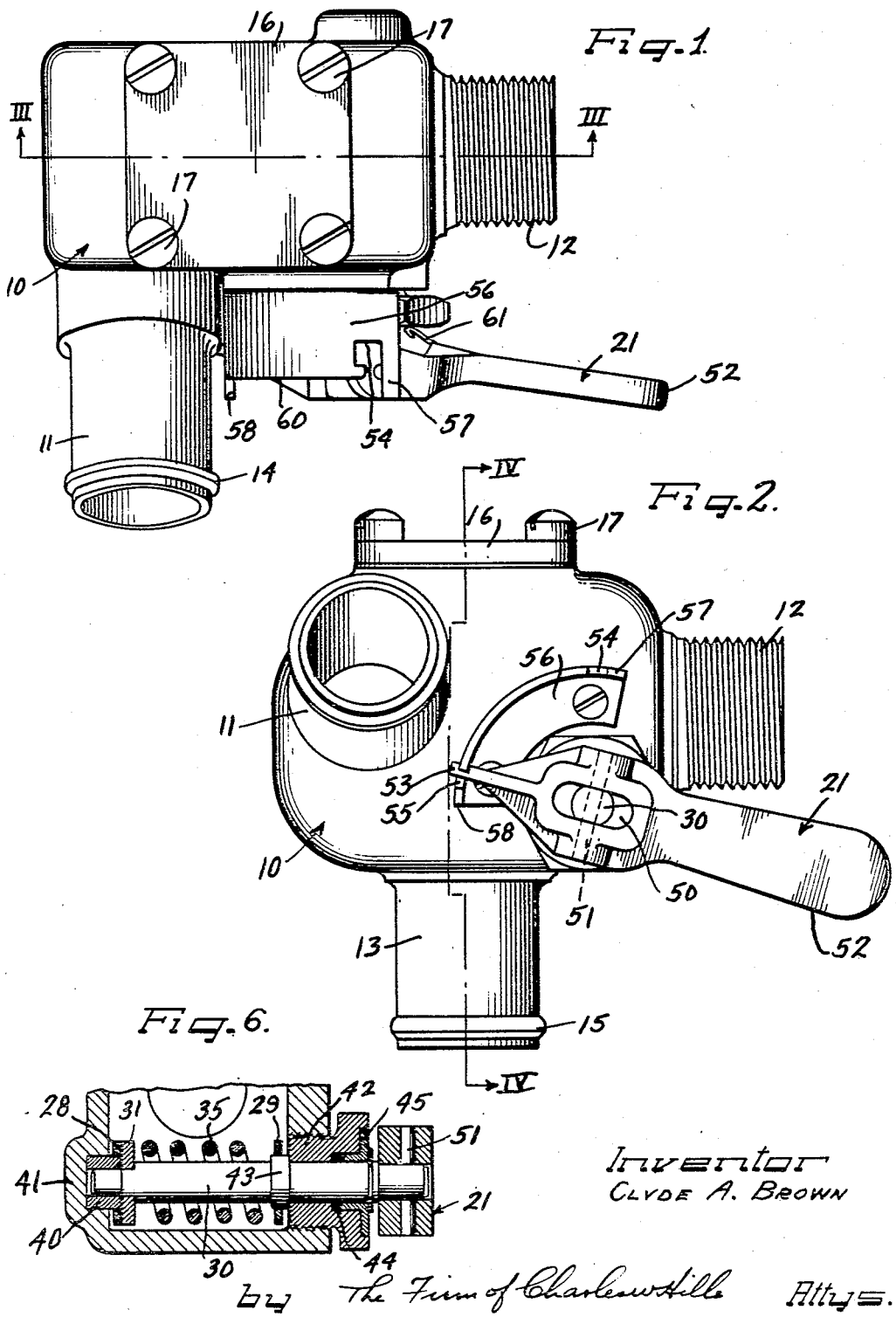
Inventor
Clyde A. Brown
by The Firm of Charles W. Hill Attys.

June 20, 1950   C. A. BROWN   2,512,052
DRAIN VALVE
Filed May 10, 1945   2 Sheets-Sheet 2
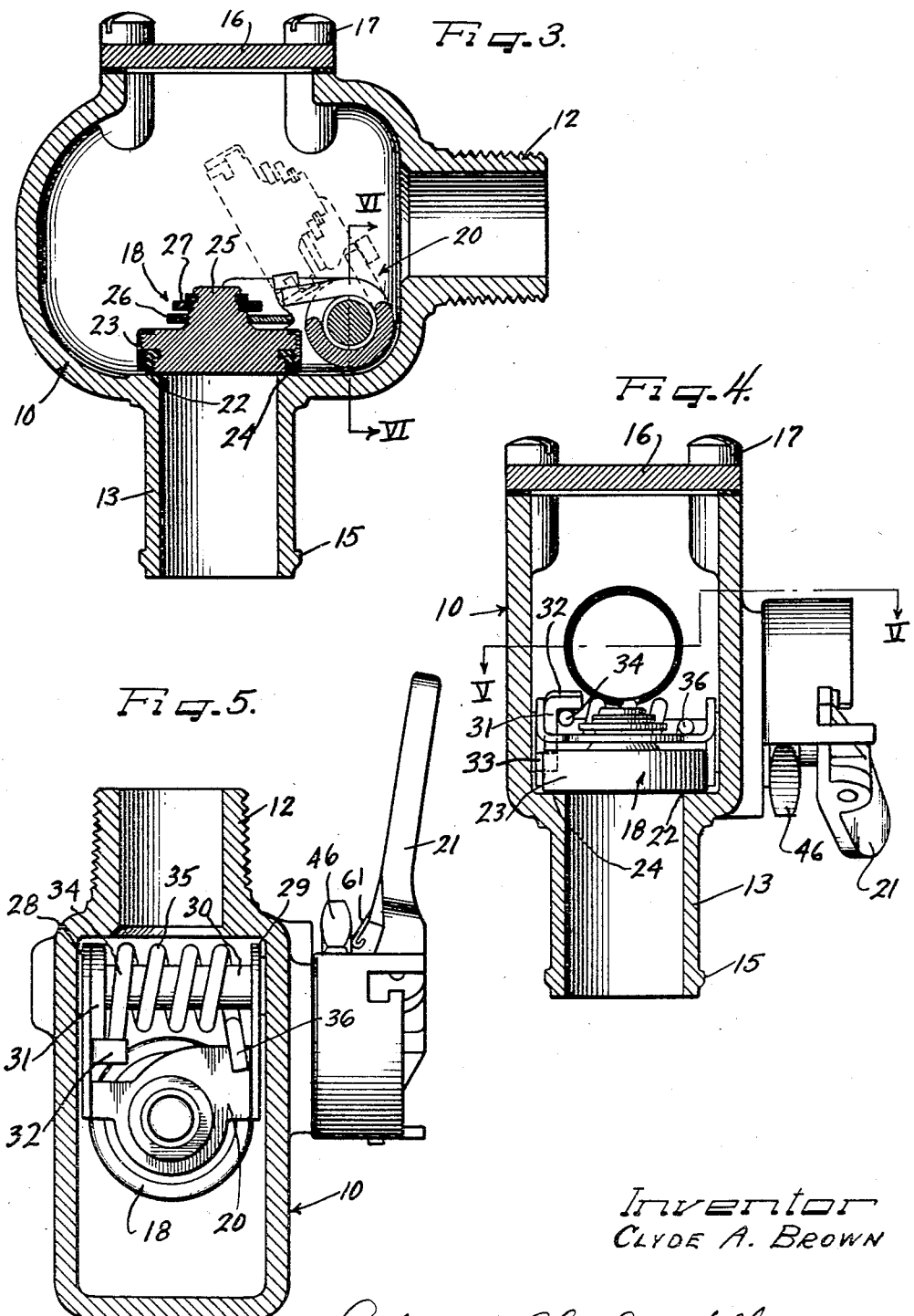
Inventor
CLYDE A. BROWN
by The Firm of Charles W Hill Attys.

Patented June 20, 1950

2,512,052

UNITED STATES PATENT OFFICE 2,512,052

DRAIN VALVE

Clyde A. Brown, Chicago, Ill., assignor to Dole Valve Company, Chicago, Ill., a corporation of Illinois Application May 10, 1945, Serial No. 592,998

3 Claims. (Cl. 251—125)

This invention relates to a drain valve and more particularly to a valve for use in an airplane and for enabling the draining of both the fuel tank and the engine.

It is the practice at the present time upon the landing of a carrier plane on the deck of a ship to drain fuel not only from the engine, but also from the tanks supplying the engine so that the plane can be stored without fuel therein.

It is an object of this invention to provide a safety drain valve which readily lends itself for use in a fuel tank draining capacity, and which can be used to drain the fuel from the engine into the carrier supply tank.

Another object of this invention is to provide a swing type of drain valve which can be locked or latched in either open or closed positions thereby precluding accidental displacement of the valve in the operation of the plane.

Yet another object of the invention is to provide a drain valve for the aforesaid purpose in which the valve can be locked under tension in closed and tightly sealed position so that when a carrier plane is being refueled, there will be no likelihood of the vacuum in the conduit to the engine being broken.

A further object of the invention is to provide a swing type of drain valve which, as it moves to within 15° of its closed position, will seat and will thereafter be progressively tensioned to insure that it will be tightly maintained against its seat.

In accordance with the general features of this invention there is provided in a valve having a casing, including inlet, outlet and drain connections, a valve at the drain connection to close the same, means for actuating the valve to open and closed positions and including spring means operable by the closing operation to spring load the valve and hold it under spring force in sealed engagement with its seat.

Yet another feature of the invention relates to the provision in the foregoing drain valve of latching means for positively holding the valve in either open or closed positions and against accidental displacement.

Other objects and features of this invention will more fully appear from the following detailed description, taken in connection with the accompanying drawings which illustrate a single embodiment thereof, and in which Figure 1 is a plan view of the valve.

Figure 2 is a front side view of the valve;

Figure 3 is a sectional view taken on the line III—III of Figure 1 looking upwardly; the dotted lines illustrating the open position of the valve.

Figure 4 is a sectional view taken on the line IV—IV of Figure 2 looking to the right;

Figure 5 is an irregular sectional view taken on the line V—V of Figure 4 looking downwardly; and Figure 6 is a cross-sectional view taken on substantially the line VI—VI of Figure 3 showing the construction of the pivot shaft and gland assembly.

As shown on the drawings:

The reference character 10 designates generally a casing or body which is made of exceptionally light metallic material, such for example, as an aluminum alloy so as to keep to a minimum the weight of the valve, which is very desirable in an airplane. The casing or body 10 is substantially hollow and includes three conduit connections; namely, an inlet 11, an outlet 12 and a drain 13. The inlet connection 11 has a rib 14 at its extremity to facilitate the fastening thereto of a hose leading, for example, to the fuel tank of an airplane. The outlet connection 12 is threaded, as is shown in Figure 1, for connection to the carburetor of an engine or the like. The drain connection 13 has a rib 15 at its extremity for facilitating the fastening thereto of a hose leading, for example, to the carrier ship supply tank.

The upper side of the casing 10 has an opening through which access may be had to the interior of the body 10 and which opening is normally closed by a detachable plate 16 secured in place by cap screws 17.

The only moving mechanism inside of the casing 10 is my novel swing or poppet valve designated generally by the reference character 18, and an actuating arm assembly designated generally by the reference character 20. This actuating arm assembly 20 is connected to a handle 21 by means of which the arm may be manually manipulated to move the valve 18 from the open dotted line position shown in Figure 3 to the full line position, or vice versa.

The valve 18 is in the form of a circular metallic disc of very light materials, such for example, as an aluminum alloy, and carries at its seating side a ring 22 of resilient rubber material, which, when the valve is used with fuel, should be of a fuel resistant character. Synthetic rubber may be used for this purpose. This ring is held in a groove in the periphery of the valve by means of a circular retainer ring 23. The rubber ring is adapted to seat on a seating surface about the drain connection at 24, and provides a sealed engagement with the seat 24 when the valve is in closed position (as shown in Figure 3). This seat envelops the opening of the drain connection so as to completely close the same off from the interior of the casing 10 when the valve is closed.

The valve 18 also has projecting therefrom into the interior of the casing a conical-like boss or protuberance 25, which is fitted in an aperture in the free end 26 of the arm 20. The boss is slightly undercut to receive locking rings 27 for locking the free end of the arm to the valve and yet at the same time permitting of a slight amount of rocking movement of the valve relative to the arm so that it may self-adjust itself to the seat 24. The arm 20 as best shown in Figure 5 is in the form of a yoke and has its legs 28 and 29 apertured and mounted on a pivot shaft 30. It is to the outer end of this pivot shaft 30 that the handle 21 is keyed. It should be noted that the legs 28 and 29 are not splined to the shaft 30, and for that reason there is provided a separate connection for transferring the rotary motion of the shaft 30 to the arm for moving the valve. This connection is in the form of an arm (Figure 5) 31, which is splined to the shaft 30. This may be effected by providing a hole in the arm 31 through which the shaft extends of a non-circular shape and by having a portion of the shaft in the hole flattened (not shown). However, any suitable keying or splining device may be used for this purpose.

The arm 31 has its free extremities provided with oppositely extending lugs 32 and 33, one of which extends toward the center of the valve for engagement with an end 34 of the spring 35 mounted on the shaft 30 (as shown in Figs. 4 and 5) and the other lug extends outwardly for engagement under the leg 28 of the yoke-like valve operating arm 20.

The other end 36 of the spring is adapted to engage on an upper side of the pivotal arm 20 so that the spring is confined between the valve actuating arm 20 and the lug 32, which is movable as a unit with the shaft 30. As a consequence, when the shaft is turned to move the valve 18 to its closed position, the rotary motion of the shaft is transmitted to the arm 20 through the spring 35. The swinging arc movement of the valve is such that when the handle approaches within approximately 15° of its closed position, the valve member 18 will seat and continued movement of the handle to its closed position results in the coiling up of the spring 35 thus placing it under an increased tension to hold the valve in a sealed tight engagement with its seat 24 at the drain connection 13. During this closing motion, the spring pressure is applied to the valve 18 through the spring end 36 which bears on the arm 20.

When the lever 21 is operated to turn the shaft 30 to open the valve, the lugged arm 31 turns with the shaft and its lug 33, engaging under the leg 28 of the arm 20 will move the arm toward the dotted position shown in Figure 3, which movement will be expedited by the releasing of the stored up energy in the spring 35.

As best shown in Figure 6, the inner end of the shaft 30 is journaled in a bushing 40 locked in the bore of a boss 41 in the casing 10. The other or outer end of the shaft 30 is journaled in a nipple 42 which comprises a part of the gland assembly. This nipple is threaded into a suitable opening in the side wall in the casing 10. It should be noted that the inner end of the nipple abuts a collar 43 formed integral with the shaft 30. The outer end of the nipple is provided with an enlarged bore in which is disposed a sealing ring 44 of synthetic rubber tightly fitted around the shaft. The sealing ring is held in place by a tubular gland element 45. The nipple 42 on the interior of the casing is provided with an enlargement or nut portion 46 by means of which the nipple may be screwed into the threaded aperture in the casing wall.

The handle 21 has an elongated slot 50 into which the outer end of the shaft 30 extends (Figure 2). The sides of this outer shaft end are slightly flattened so as to fit in the elongated hole 50. Also this outer end of the shaft 30 is pivotally secured to the handle by means of a transverse pin 51 so that the handle may be pivoted on the outer end of the shaft in the latching and unlatching operations to be hereinafter described.

One end of the handle 21 is formed into a hand grip portion 52, and the other end is formed into a locking projection 53 cooperable with spaced bayonet slots 54 and 55 in an angular locking plate 56 bolted to the outer side of the casing 10. This locking plate 56 has opposite projections 57 and 58 for limiting movement of the arm to open and closed positions respectively. The projection 53 of the arm when not in the slots is adapted by pivoting or tilting of the lever on the pin 51, to ride along the intermediate surface 60 located between the bayonet slots 53 and 54. The arm 21 is normally urged to the tilted position shown in Figure 1 by a leaf spring 61 secured to the under side of the lever and bearing against the outer end of the gland 45 previously described.

In Figures 1 and 2 the lever 21 is shown in a position in which the valve is closed. To move the valve to its open position it is necessary to press the grip portion 52 of the handle 21 in the direction toward the casing body so as to unlatch the projection 53 on the lever from the bayonet slot 55, whereupon the projection 53 may be disposed on the edge 60 of the angular locking plate 56. During this course the lever spring 61 is deflected so as to be put under tension.

Thereafter the lever or handle 21 may be rotated in a clockwise direction as shown in Figure 2, until its projection 53 is latched in the bayonet slot 54 of the plate 56 at which time the valve will be in the open or dotted position shown in Figure 3.

It should be noted that while the shaft 30 may be made of steel, other parts, such as the nipple 42, the lever, or arm 21 and the latching or locking plate 56, may be made of a light cast aluminum alloy.

It is clear from the foregoing that when the valve member 18 is in the closed position shown in Figure 3, the drain connection 13 will be completely sealed off from the inlet and outlet connections 11 and 12 of the valve. This is important since if the valve is used in conjunction with the engine of an airplane, there will be no interference with the refueling of the engine; in other words, when the engine is being refueled, there is no drain hose attached to the drain connection 13, and hence it is important that that drain connection be sealed off so that it will not in any way interfere with the vacuum which may be as much as 17" in the conduit to the engine (including both the pump and the carburetor).

Then, too, by reason of the fact that during the last 15° of the closing operation the spring loading on the valve is augmented as described above, a very positive closing force is applied to the valve securely holding it against its seat 24. This is a safety feature of the present invention which is important in my intended application of the valve. Furthermore, should there be any slight variation or irregularity in the seat or in the sealing ring 22, the same is readily adjusted for by reason of the fact that the valve 18 is rockingly carried on the arm 20 and can readily adjust itself to a true seat under pressure at the drain connection.

It should be noted that my valve structure also lends itself to use in a two-way valve. For illustration, in Figure 2 if the outlet connection 12 is plugged or eliminated, the swing valve 18 can still be used to control the flow of fluid from the inlet 11 to the drain connection 13, which, in that event, would be the outlet connection.

Thus my invention lends itself nicely to a simple two-way drain or shut-off valve in which minimum striction to flow and positive shut-off is desired. For instance such a two-way valve could be utilized to advantage in low pressure systems, as a low pressure drop unit with positive shut-off, which would be superior to the present day gate type valves. Such gate type valves require frequent servicing and replacement due to leakage developing across metal to metal seats, which condition is not present in my valve.

I claim as my invention:

1. A valve for closing a drain connection comprising a casing, a shaft pivotally mounted in said casing, a seating portion adapted to be positioned over said drain connection, a yoke having spaced legs and being rockingly attached to said seating portion, a spring disposed about said shaft having one arm associated with said shaft for rotation therewith and the other end disposed in contact with the upper surface of said yoke for moving said valve toward closing when said lever is rotated, said shaft having an arm disposed beneath one leg of said yoke for lifting said valve under the urging of said spring for opening said drain connection.

2. In a valve of the type including a casing having inlet, outlet and drain connections in communication with each other inside the casing and having a pivotally mounted swinging valve closure spring-loaded against its seat, the improvement comprising, in combination, a shaft pivotally mounted in said casing, a valve closure having an upstanding conically shaped neck portion, a yoke having a pair of spaced legs supported by and pivotally mounted on said shaft and having a body portion with an opening disposed on a centrally located vertical axis for loosely receiving the neck portion of said valve closure, locking ring means carried by the neck portion to retain the yoke in loose fitting assembly, an annular resilient ring fixed in said valve closure to provide a resilient seating surface, and actuator means between said yoke and said shaft and having a resilient element for spring-loaded resilient self adjusting engagement of said valve closure with said seat.

3. A swing type valve comprising a casing having inlet, outlet and drain connections in communication with each other inside the casing and defining a drain connection seat, a shaft pivotally mounted in said casing, a yoke having a pair of apertured arms loosely mounted for pivotal movement about said shaft, a closure valve characterized by an upstanding neck portion loosely fitted in said yoke as and for universal joint seating on said drain seat, an annular resilient seating ring arranged in said closure valve to resiliently engage said drain seat, a coil spring loosely mounted on said shaft for spring loading said valve closure and having one projecting end for engagement with said yoke, a lever arm splined to said shaft having a projecting ear for cooperation with said yoke to swing said closure valve to an open position and having a second oppositely projecting ear for cooperation with a second projecting end of said coil spring, a handle attached to said shaft and a detent for cooperation with said handle to lock said swing type valve in selected position.

CLYDE A. BROWN.

REFERENCES CITED

The following references are of record in the file of this patent:

UNITED STATES PATENTS

| Number | Name | Date |
|---|---|---|
| 923,808 | Breth | June 8, 1909 |
| 1,020,022 | Burke | Mar. 12, 1912 |
| 1,733,672 | Ross | Oct. 29, 1929 |
| 2,246,802 | Kehm | June 24, 1941 |
| 2,268,806 | Curtis | Jan. 6, 1942 |
| 2,312,290 | Smith | Feb. 23, 1943 |